May 2, 1933.  H. R. STUART  1,907,223
DIRECT MOTOR DRIVE FOR MACHINE PARTS
Filed July 18, 1930  3 Sheets-Sheet 1

INVENTOR
H. R. Stuart.
BY Louis Illmer
HIS ATTORNEY

May 2, 1933. H. R. STUART 1,907,223
DIRECT MOTOR DRIVE FOR MACHINE PARTS
Filed July 18, 1930 3 Sheets-Sheet 2

INVENTOR
H. R. Stuart.
BY Louis Illmer
HIS ATTORNEY

INVENTOR
H. R. Stuart.
BY Louis Illmer
HIS ATTORNEY

Patented May 2, 1933

1,907,223

UNITED STATES PATENT OFFICE

HARVE R. STUART, OF SPRINGFIELD, OHIO

DIRECT MOTOR DRIVE FOR MACHINE PARTS

Application filed July 18, 1930. Serial No. 468,809.

My invention relates to a simple and novel magnetically operated actuating means or mover especially adapted to be directly connected to driven machine parts without the need of any speed reducing gearing, and more particularly has to do with an electric motor comprising an armature member and a field member mounted in oscillatory relation, each such member being provided with one or more pairs of electromagnetic pole faces arranged and controlled to bring about a long-range reversible impelling movement therebetween.

The complementary pole shoe faces of my armature are preferably mounted in oppositely disposed relation about the armature axis and kept offset lengthwise therealong in order to allow of a suitable drive gear to be introduced between said spaced shoes; this linkage is in turn directly connected to a reciprocative driven follower means such as a pump, compressor, or the like, and which power absorbing member may be bodily carried by the stator. The armature may be mounted in suitable bearing means, and the present invention utilizes this same bearing in common for carrying the armature and to take up any drive linkage thrust that may be required to transmit power to said reciprocated parts.

As far as the underlying principle of motor operation is concerned, this is similar to that embodied and claimed in my copending application Serial No. 294,482 as filed July 21, 1928, patented September 1, 1931, No. 1,821,123. The oscillatory members thereof have however been modified in certain respects and structurally improved to better suit present purposes.

The unitary field member herein disclosed is preferably of the duplex type wherein bored complementary bipolar side-pieces are spaced apart and adapted to receive the power transmission gear therebetween. A twin shoe type of armature is entered through both of the aligned field bores and the respective shoes thereof are made to cooperate with the inturned pole faces of a different side-piece.

The object of my invention is to devise a self-contained motive assembly of the character indicated that may be operated by either direct or alternating current and serve to impart a directly impelled reciprocative movement to piston-like follower members or similar power absorbing machine elements. Embodied herein are also improved switch controls of the positive type adapted to periodically reverse the oscillatory movement of my motor members by controlling the current flow to the excitation coils of one such member. In addition, other novel structural features are disclosed which facilitate the manufacture and otherwise promote the application of my motive device, all of which will hereinafter be pointed out in detail.

Reference is had to the accompanying three sheets of drawings which are illustrative of a preferred embodiment of my invention, and in which drawings:

Fig. 2 represents a sectional assembly view thereof as taken in elevation along the offset line 2—2 of Fig. 1, while

Fig. 6 illustrates an end view of my armature assembly as removed from the field bore while Fig. 7 is a longitudinal sectional view thereof as taken along the line 7—7 of Fig. 6.

Figure 8:
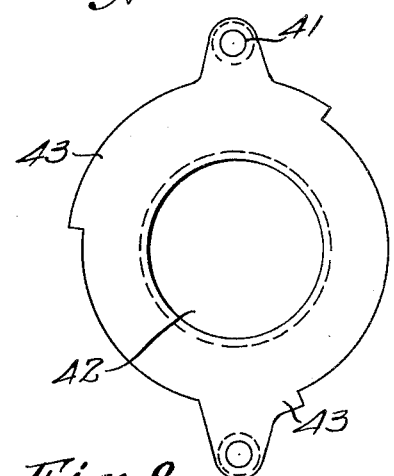
Figure 9:
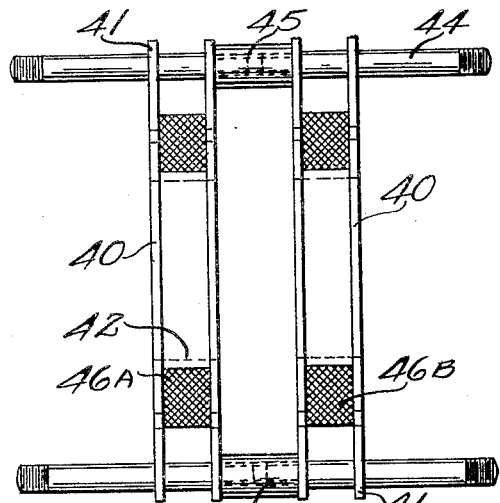

Figs. 8 and 9 respectively represent an end and a top view of the spaced spools that mount my stationary armature coils.

Figures 10, 11:
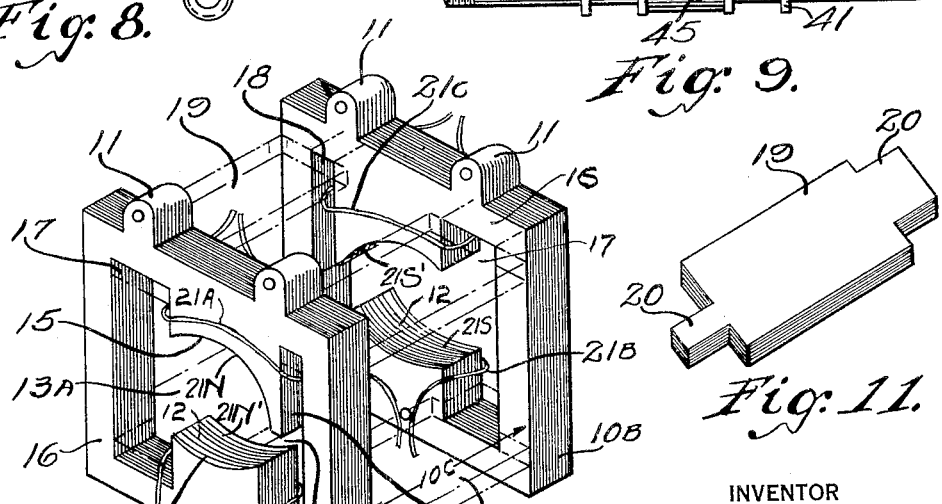

Fig. 10 shows a perspective view of a built-up field framework with its spacer bridge pieces indicated in phantom outline and of which one such piece is detailed as Fig. 11.

Figure 2:
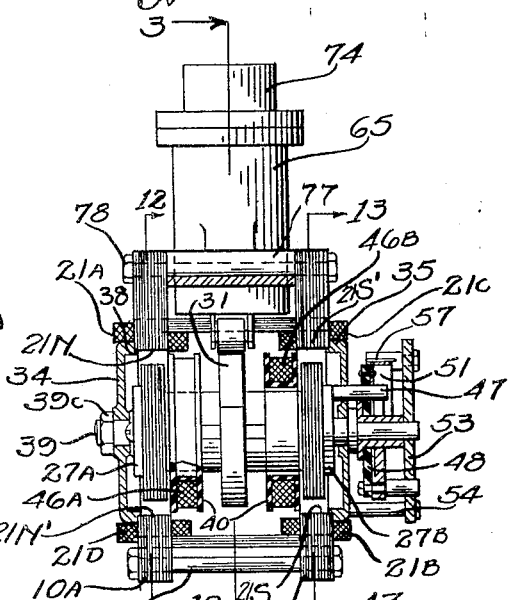
Figure 12:
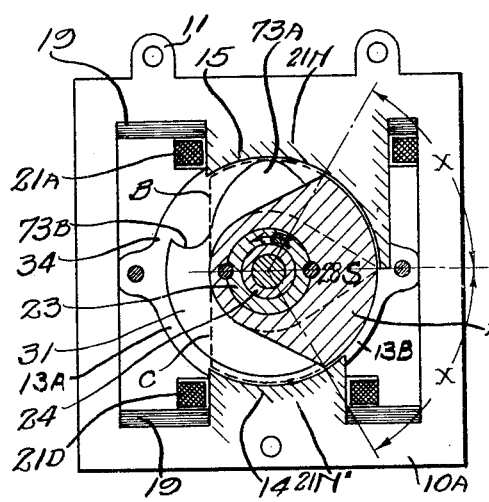
Figure 13:
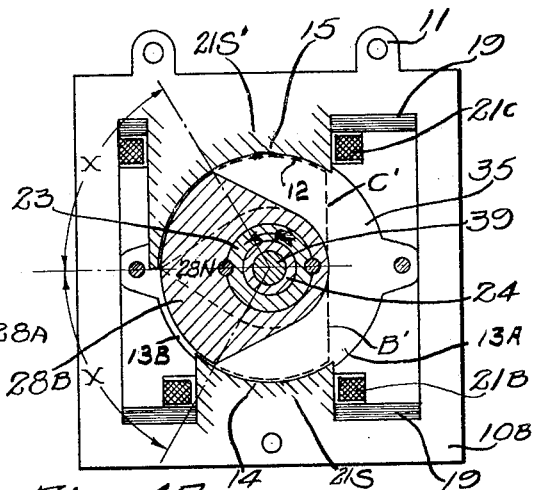

Fig. 12 shows a partial elevational view taken in vertical section through one of the armature shoes along line 12—12 of Fig. 2, while Fig. 13 is a similar view through the oppositely disposed shoe as taken along line 13—13.

Figures 14, 15, 16:
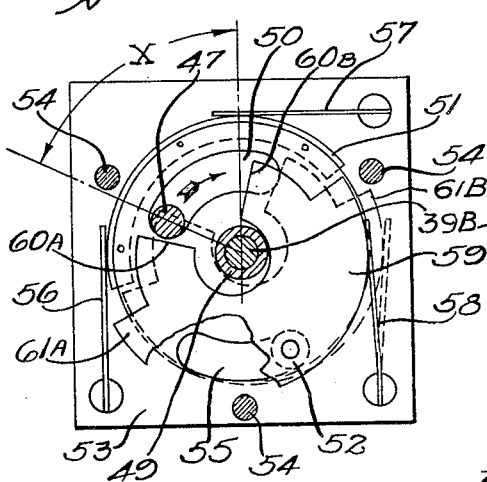

Fig. 14 is a fragmentary rear end view disclosing certain details of my switch mechanism, assuming its guard plate to have been removed.

Fig. 15 shows a sectional view of said mechanism taken along the vertical line 15—15 of Fig. 14 with the switch-pin standing in its transitory mid position of movement, while Fig. 16 is taken along line 16—16 of Fig. 15 to illustrate the relative position of these parts when the switch-pin is thrown into one of its extreme positions of travel.

Figures 17, 18:
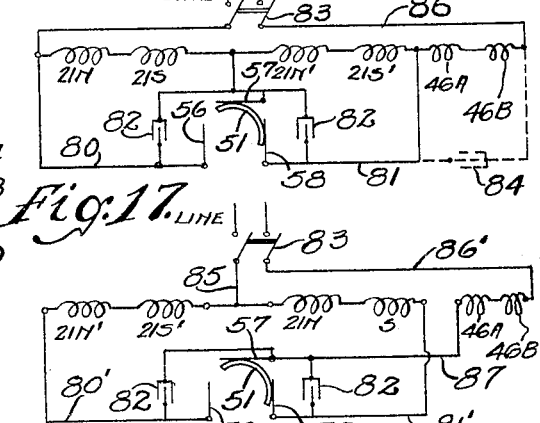

Fig. 17 is a wiring diagram showing a preferred mode of interconnecting my windings and the switch control therefor, and Fig. 18 represents an alternative wiring diagram.

Referring now in detail to the drawings, the structural characteristics of my built-up duplex field member will first be described. Fig. 10 shows this to comprise companion bipolar field side-pieces 10A and 10B that are respectively bored and having their innermost flat bore-end faces spread apart to provide for an interspace 10C therebetween. Each such side-piece includes a separate group of laminated magnetic stampings of which the perimeter may be given a rectangular contour with a pair of apertured ears such as 11 extending upwardly therefrom, while the medial bottom region of said stampings is provided with a complementary bottom bolt hole 11A.

The respective central field bores 12 are aligned and each such bore affords a pair of inturned pole faces which are respectively parted by the unequal interpolar gaps 13A and 13B (see Fig. 10) to constitute a relatively short field pole face profile 14 and a relatively long field pole face profile 15; as will appear presently, these profiles are arranged to bring about a wide angular swing-range on part of my armature. Said stampings may include an endless yoke element designated 16, preferably disposed to interconnect the outermost base region of the respective field poles of each side-piece around the interpolar gaps thereof. The laminations are shown doubly slotted as at 17 and 18 adjacent to the base region of each such pole, said slot widths being varied to conform with the uneven span disposition given to said pole face profiles. As will be understood, each group of laminations is intended to be held together by suitable tie means.

It will be observed that the duplex field pieces 10A and 10B of Fig. 10 are reversely mounted in parallel relation, also that they may be kept spread apart by upper and lower pairs of spacer blocks or bridge strips such as 19, each preferably made up of laminated magnetic material having a shouldered tenon 20 at each end thereof that is snugly fitted into one of said slots to make a rectangular joint therewith in the fashion indicated by dotted outline. The whole of this framework is then bolted together into a unitary field structure. For convenience of reference, the outermost flat end face of the assembled field piece 10A will herein be termed "front" while the corresponding face of the field piece 10B will be termed "rear end" of my motor.

Each of the inturned field poles may be wound with a separate energizing coil schematically represented in Fig. 10 by a single turn and respectively designated as 21A, 21B, 21C and 21D. These field coils are intended to be suitably interconnected and placed under the control of switch means that will hereinafter be more fully explained. The respective field coils as herein used, are preferably connected and primarily energized in multiples of two so that the front upper long pole face profile marked 21N in Fig. 10 will effectively cooperate with the rear lower short pole face profile marked 21S, while the front lower short face profile marked 21N' is in turn intended to similarly cooperate with the upper long face profile marked 21S'.

Figures 6, 7:
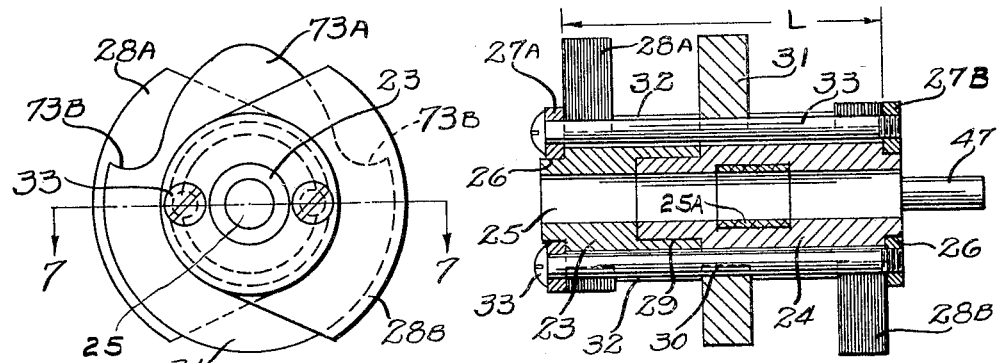

Attention will now be directed to the structural details of an armature that is especially adapted to oscillate under the influence of the aforesaid field pole face distribution. Referring to Figs. 6 and 7, the armature hub may be made up from soft iron or other magnetic material and preferably comprises a pair of separable sleeve sections designated as 23 and 24 respectively, that are telescopically centered and may be provided with an aligned internal hub bearing such as 25. This bore may be centrally recessed at 25A which may be loosely packed with soft felt to facilitate lubrication.

Each outermost end of these adjoined hub sections is shown equipt with a centering tit 26; respectively mounted thereon, is a front and a rear clamping washer such as 27A and 27B, of which the last named carries a rearwardly overhanging switch pin 47. Immediately inward of each such washer, the outside hub diameter may be undercut and respectively arranged to mount one of the sector-like or fan-tail shaped laminated pole-shoes 28A and 28B which are bored and set opposite each other as shown in Fig. 6.

Said telescopic hub joint additionally comprises a shouldered male part 29 that is preferably centered into the counter-bore of the section 23 and which male part may be further provided with an intermediate turned groove 30. Snugly mounted within this groove is an eccentric or cam-like drive element 31 whose bore size is kept substantially equal to that given to said pole shoes and which element is preferably fabricated from non-conducting material such as fibre or the like. The whole of my armature assembly may be clamped together and given an overall diametral size that will freely pass through the field bore. The exterior of each hub section may be further provided with a pair of spaced longitudinal surface channels such as 32, respectively adapted to receive therein a through clamping screw such as 33. These screws may be entered through aligning holes in the front washer 27A and threaded into the complementary rear washer 27B as in Fig. 7. The axis of each such screw is so located as to serve for a key that locks the assembled members 28A, 28B and 31 to the armature hub and thus cause them to oscillate in fixed relationship.

The overall lengthwise shoe spacing marked "L" (see Fig. 7), is purposely kept somewhat shorter than the corresponding dimension afforded between the outermost bore-end faces of the interspaced field pieces 10A and 10B. As shown in Fig. 2, the outermost bore-end portions of the field piece 10A carries a front end bracket 34 while the opposite bore end of the field piece 10B is similarly equipt with a rear end bracket 35. Each bracket is provided with a pair of apertured fastening lugs such as 36 (see Fig. 14), that may be oppositely disposed to extend outwardly from the bracket perimeter. In addition, each such bracket has a small centrally disposed axle receiving bore therethrough such as 37 (see Fig. 15), and each innermost bracket face is also provided with a pilot ring 38 which is turned concentric with the bracket bore 37 and snugly fitted into one of the straight field bore-ends for axle centering purposes. It will be observed that the stamped bore of my laminated pole piece is here utilized as a female member for entering said pilot or integral male member of my bracket therein. In the case of the rear bracket, this further has an arcuate opening 37A disposed concentric with its axle bore 37 to enable the switch actuating pin 47 to rock in unison with the armature oscillations.

Fixedly carried between the bracket bores, is a stationary axle 39 extending through the hub bearing 25 and serving to rotatively mount the armature thereon. The rear axle end as entered through the bracket 35, is equipt with a stop shoulder or head 39A and a shank 39B overhangs axially rearward therefrom. Said axle may be centrally drilled at 39D as shown by dotted lines in Fig. 15 to provide a feed conduit adapted to supply oil or grease to the bore recess 25A. The forward axle end is threaded and entered through the bore of the bracket 34 and a nut 39C applied thereto so as to fixedly secure the axle in place (see Fig. 2). It is not essential however that the armature mounting be of the prescribed "dead axle" type, since it may likewise be carried upon a movable rock-shaft having the overhanging ends thereof supported by bracket bearings in the conventional manner. It is emphasized that the stipulated pilot arrangement as entered into the regular field bore without resort to any counterbore, is still applicable when using either kind of armature mounting; this expedient not only facilitates rapid and accurate motor assembly, but makes for a truly centered armature at the minimum of fabrication costs.

The present invention further provides for a novel mounting on part of the armature windings; as disclosed in Figs. 8 and 9, such windings need not be movably carried with the armature but preferably comprise a pair of independently supported stationary coil spools such as 40, made of suitable insulating material. Extending laterally away from the perimeter of each spool flange, are complementary apertured yoke-like projections such as 41. The bore 42 of said spools is made somewhat larger than the outside diameter of the armature hub sections 23 and 24 to freely slip thereover in the manner represented in Fig. 2. As a further refinement, certain of the spool flanges may be equipt with a pair of peripherially raised retaining lips such as 43, which are disposed to snugly engage behind the respective innermost flat faces of the spaced field pieces 10A and 10B and lock said spools therebetween. The spools 40 are shown carried upon a pair of shouldered sustaining rods such as 44, each built up of two separate stud parts that are interconnected by an enlarged distance piece 45 preferably fabricated from insulating material. Said spools may each be further provided with a stationary armature excitation coil such as 46A and 46B, which are preferably connected in series as shown in the wiring diagram Fig. 17. Fig. 9 shows the assembled spools spacedly suspended across said rods with their yokes mounted upon opposite stud ends. It will be apparent however, that instead of resorting to the described spaced spools, a single spool may be substituted therefor, except when it is preferred to retain interspacing clearance therebetween through which to make direct gear connection with the interiorly disposed drive element 31.

Assuming the armature sections shown in Fig. 7 to have been separated to allow the spools 40 to be mounted thereon in the interposed relation indicated in Fig. 2, then the entire assembly may now be bodily entered into the outermost bore end of the field piece 10A of Fig. 10, by first turning the complementary rods 44 slightly in a clockwise direction (as seen from the front motor end) until one of the first entered rod ends is about to strike the innermost vertical face of the narrow slot 18 of the rear field piece 10B, whereupon said complementary rods are turned backward into horizontal position; this in turn causes certain of the retaining lips 43 to become interlocked in breachwise fashion behind and between the respective innermost flat faces of the spaced field pieces.

It now remains to insert the axle, then place the forward and rear bracket lugs 36 over their respective threaded rod ends and screw on the nuts, whereupon the mounting is made ready for imparting oscillatory movement to the armature while its energizing coils 46A and 46B remain in a stationary relation thereto.

Referring to the structural features embodied in my switch control, this as shown in Fig. 15, may comprise an insulator disc 48 whose centrally disposed bushing 49 is rotatably mounted upon the axle shank 39B. Said disc is provided with a concentric top slot 50 therethrough and which slot is kept somewhat shorter in span length than is the aforesaid registering arcuate opening 37A of the rear bracket 35. The switch actuating pin 47 extends rearwardly through the slot 50 and also projects through and beyond the rear bracket opening 37A as shown. Said disc carries a drum-like metal contact segment 51 that embraces the upper half of the disc periphery while a rearwardly extending fulcrum pin 52 is also carried by said disc at a point directly below this segment.

Centered upon the outermost free end of axle shank 39B is a rectangular guard or supporting plate 53 made of insulating material and this may be fixedly held in place by a plurality of spacer studs such as 54, which may be upheld by the rear bracket 35 in the manner indicated. Said plate may also be provided with a concentric bottom slot 55 therethrough. Extending forwardly from the guard plate, are shown three overhanging posts each carrying a flexible contact finger and respectively designated 56, 57 and 58 (see Fig. 16). These inturned fingers are circumferentially disposed around the drum segment 51; in the case of the fingers 56 and 58, their respective points of contact are preferably kept directly opposite each other while the finger 57 is disposed in an intermediate relation and remains permanently in contact with the segment 51.

My switch may further be equipt with a floating non-conducting finger actuator 59 (see Figs. 14 to 16) that is shown pivotally mounted upon the fulcrum pin 52 in close adjacency to the rearmost face of the disc 48. Said fulcrum pin is extended through the guard plate slot 55 and the actuator is provided with oppositely disposed spaced jaws 60A and 60B respectively, which are adapted to be alternately struck by the switch pin 47 after the latter has first been allowed a limited slip or freedom of oscillatory movement. The central region of the actuator is shown cut out sufficiently to freely clear the encircled bushing 49 whenever the actuator is shifted by either of said jaws about its fulcrum 52. For reasons that will hereinafter appear, the floating actuator is further provided with oppositely disposed toes 61A and 61B that are radially retractable with respect to the axle center in the fashion shown by full and dotted positions of Fig. 16.

It now remains to describe the driven machine parts which in the present embodiment, comprise a compressor mounted centrally upon and between the spaced yoke portions of the field pieces 10A and 10B. In accordance with Fig. 3, the vertical cylinder 65 is equipt with a trunk type of ring-packed piston 66, having its lower piston end flanged outwardly into a crosshead-like guide 67 which in turn slides in the enlarged guide-bore 68. The piston may be prevented from turning about its axis by tongue and groove means such as 69.

Thrusting between the inturned top face of the guide-bore and said flanged guide, is a piston return spring 70 of the compression type. Depending from the piston, is a fork 71 that reaches down into the clearance gap or interspace 10C and may be provided with a roller or other suitable follower member 72 (see Fig. 3). The latter is intended to cooperatively ride on the cam face of the drive element 31 and together constitute a power transmission linkage or gear. The cam profile preferably provides for a central throw portion 73A having oppositely sloping side faces that respectively terminate in a depressed region such as 73B, each having a stop-like abutment serving to limit the armature overtravel. The total normal armature swing is intended to correspond to twice the angle "X" which in turn carries said roller into registry with one or the other of said cam depressions.

In further reference to the compressor details, the cylinder top may be closed by a head 74 provided with the usual suction check valve 75 and a discharge check valve 76 and which head is intended to be removably held in place in the conventional manner by bolts or the like. The base of the cylinder is preferably provided with complementary transverse tubular bosses such as 77; extending therethrough are tie-bolts 78 which secure the cylinder to the adjacent fields ears 11 and at the same time, bind the field members together. A similar supplementary bolt is also shown entered through the respective bottom field holes 11A.

Having described the more essential structural features of my device, its mode of operation may be traced by reference to the wiring diagram Fig. 17. As intimated the field coils 21A and 21B are preferably connected in series, likewise the coils 21C and 21D; these coils are diagrammatically designated in terms of the prevailing face polarities to correspond with Fig. 10, that is to say 21N—21S, and 21N'—21S' respectively.

The twin armature coils, designated in their entirety as 46A and 46B, are connected to establish opposite polarities in the pole shoe faces 28A and 28B.

In accordance with the wiring diagram Fig. 17, one of the 21N—21S field coil terminals may be spliced to one of the 21N'—21S' terminals and this splice connected to the intermediate finger 57. The outermost free end connections or terminals of said spliced field coils are respectively carried by the lead wires 80 and 81 to the fingers 56 and 58. If desired, a separate condenser such as 82 may be employed across each pair of make-and-break contact points and these are found efficacious in eliminating interference with reception of neighboring radio sets. Since it is herein preferred to alternately short circuit the respective field coils rather than attempt to break the current flow therethrough, such short circuiting expedient generally suffices to obviate any undue sparking at the breaking point of the finger contacts without resort to said condensers. The armature coils 46A and 46B are connected in series with one of the free field coil terminals, whereupon the outermost armature lead wire 86 is carried on to the double pole service switch 83 while the other switch pole is carried back to the lead wire 80 as shown. In the present disclosure, it is contemplated to maintain a current flow through the armature windings while the switch 83 remains closed.

The segment 51 is intended to be alternately shifted into contact with one or the other of the fingers 56 or 58; when positioned as shown in Fig. 17, the current will flow through the armature windings, thence through the field coils marked 21N and 21S but during such period, the field coils 21N' and 21S' will be short circuited through the interconnected fingers 57 and 58. Upon throwing said sector over into its opposite extreme position, the current will flow through the armature coils 46A and 46B and the field coils 21N' and 21S', while the coils 21N and 21S will then be short circuited through the interconnected fingers 56 and 57. A substantially continuous flow of current is maintained through the armature windings while alternately energizing my complementary pairs of field windings to bring about a reversal of armature movement, all without any power wastage or need of a supplementary resistance to forestall abnormal rush of current during the cited switching operation. When operating my motor with alternating current, the armature terminals may with advantage be bridged as shown in Fig. 17 by dotted lead wires, for the purpose of introducing added capacity reactance by means of the condenser 84, although this is not an essential expedient.

As will be understood, the various field and armature coils may also be connected in any suitable manner other than the style of wiring that has been more specifically described in connection with said diagram. As an instance, reference is made to Fig. 18 in which a pole of the switch 83 is connected to the armature coil and through the lead 87 carried to the intermediate finger 57, while the leads 80' and 81' remain connected as before. Assuming the segment 51 to be standing in the position indicated in Fig. 18, the difference lies in now breaking the field circuit 21N' and 21S' rather than short circuiting these coils in the manner practiced in the previously described diagram. It is also within the scope of my invention to have said switch control the current flow through the armature excitation coil instead of through the field windings.

Attention is now directed to Figs. 12 and 13, where the armature is shown as placed in its mid oscillatory position and the oppositely disposed fantail shoes 28A and 28B assume a substantially horizontal position while the throw 73A of the drive element 31 stands in an upright relation thereto. Said shoes are intended to swing to each side of such mid position through a relatively wide angular range marked "X" and thereby reach the respective extreme shoe positions that are represented in dotted outline and designated as B and C.

While short circuited, the reactive effect of the interconnected field coils, is insignificant when operating with direct current. Assuming the use of such current and the segment 51 to have been thrown into the contact position shown in Fig. 17, then the windings of the uppermost long face profile 21N of the field piece 10A in Fig. 12 and the lowermost short profile marked 21S of the field piece 10B in Fig. 13 will for the moment, be energized by the line current which passes in series through the armature coils 46A and 46B giving an "S" polarization to the shoe face 28A and an "N" polarization to the shoe face 28B. The resulting torque will therefore turn the armature in the counter-clockwise direction represented by the arrow of Figs. 12 and 13 until each of the leading shoe tips approach their extreme swing positions that are respectively designated as B and B', that is to say the respective shoe faces are preferably carried into overlapping relation with their cooperating field pole faces to such extent that the leading tip of each armature shoe face will fall into substantial registry with the furthermost end of its overlapped field pole profile in the manner indicated by dotted shoe outline.

On the other hand, assuming the use of alternating current, it will be understood that the given relative polarizations are taken in terms of instantaneous values. In such instance, I have found a relatively heavy induced current flow is set up in the short circuited field coils, especially so during the initial portion of each armature swing but which induced current tends to wane rapidly while the receding armature shoes are being withdrawn from overlapping relationship with respect to their contiguous field poles. Should the segment 51 be held in the contact position shown in Fig. 17, the polarization of the long pole face profile 21N and that of the short face profile 21S will then assume a relationship identical with that previously described in connection with the direct-current operations. The induced secondary current flow in the short circuited coils 21D surrounding the field pole designated 21N' and also in the interconnected coil 21C of the long field pole designated 21S', tends to set up an opposite polarity in the poles 21N' and 21S' respectively. Accordingly, the lowermost short face profile of Fig. 12 then repels its cooperating armature shoe face 28S and the uppermost long pole face profile of Fig. 13 repels its armature shoe face 28N, the torque effect being additive so that the resultant effort becomes greater than would be produced by the primarily energized field pole face profiles 21N and 21S alone.

If now the contact segment 51 is thrown over into its opposite position, the now leading tip of the reversely moving pole shoe 28B will be attracted by the closely adjacent depending profile end of the field pole face 21S' and thus cause the armature to rotate in a clockwise direction (i. e. contrary to the arrow) and thereby draw said leading shoe tip toward its extreme dotted position designated as C'.

Instead of being of the conventional impulsion type, my rotor may be wholly energized by primary currents and the field coils energized by both primary and induced currents. The spaced stationary field windings are disposed to alternately bring one of the shifting pole shoe faces into intimate inductive relationship therewith when the armature approaches an extreme position of oscillatory travel. It is at this particular instant that it is preferred to close my short-circuiting switch. On the other hand, it is expedient to delay reopening said short circuit until the armature has impelled itself out of maximum field intensity and into its opposite travel region of minimum inductive influence, to the end that detrimental sparking may be obviated while the switch contacting points are being separated.

In addition to resorting to unequal face profiles for the respective field poles, it will be observed that each of the interpolar parting gaps 13A is preferably made considerably longer than their opposed gaps 13B, also that the circumferential face span length of each armature shoe is kept larger than the shorter gap 13B. The field pole profile disposition is such that in either extreme of armature travel, one of said shoe faces still bridges its cooperating shorter interpolar gap.

It is emphasized however that this extreme swing position does not correspond to the position of minimum armature reluctance; as has been amplified in the above identified copending application, the equivalent of the switch member 51 is purposely shifted prior to allowing the armature to reach any such stalling position in order to retain reversibility on part of the movable member of my motor.

It is further pointed out that whenever my armature passes through its full-lined mid position represented in Figs. 12 and 13, the leading edge of the shoe 28B when traveling in a counter-clockwise direction, falls into substantial registry with the leftward profile end of the then primarily energized short field pole face 21S of Fig. 13. A like effect is produced when the armature moves in a clockwise direction, since the leading tip of the shoe face 28A shown in Fig. 12 will then approach registry with the rightward profile end of the now energized short pole face marked 21N'; said shoe is finally drawn into its extreme position shown in dotted outline and designated as C. The switch segment 51 is thereupon thrown back into its original position, to the end that the armature may be regularly or intermittently oscillated against load resistance within the desired swing limits.

The described switch means may be shifted in synchronism with the armature movement by any suitable means, but it is preferred to resort to a mechanism that affords a positive action and whose function may be traced as follows:

Assuming the actuating pin 47 to be returning from its extreme leftward position as seen in Fig. 16 and that the field coils have just been shifted as described, then said pin is intended to have a certain initial freedom of movement in the direction of the arrow of Fig. 16 until its mid travel position is approached. Thereupon said pin is made to strike the projecting jaw 60B and as a result of which, the floating actuator 59 is bodily turned clockwise around the shiftable fulcrum pin 52 and thrown into the operative eccentric position that is defined in dotted outline.

Such relative movement causes the contact finger 58 to be raised outwardly and away from the armature axis by the lifted toe 61B. After said jaw 60B has been carried along sufficiently to allow said actuating pin to engage the rightward end of the disc slot 50, a clockwise rotary movement will be imparted to the insulator disc 48 about the shank 39B. The shiftable fulcrum pin 52 is allowed to slip freely into the slot 55 and serves to limit the rotation of the disc 48. Said disc movement first causes the then trailing end of the segment 51 to break the connection between the fingers 56 and 57 and upon further clockwise movement, the then leading end of the segment 51 is in turn carried underneath the raised finger 58 and the toe 61B is carried along sufficiently to allow the finger 58 to fall upon and contact with segment 51. The intent is to break the contact between the fingers 57 and 56 prior to closing the fingers 57 and 58, thus insuring that at least one pair of interconnected field coils shall remain in series with the armature coil. In addition, my anti-chattering contact finger is radially dropped against the segment rather than have the segment tangentially approach contact with the finger, in order to obviate any wavering in the fundamental armature oscillation.

A reversal of the field coil connections, sets up a responsive change in armature travel, and the resulting counter-clockwise movement of the pin 47 will likewise strike the jaw 60A and shift the actuator in a counter-clockwise direction, thus causing the toe 61A to cooperate with the finger 56 in an identical but reversed manner from that traced in connection with the opposite toe 61B.

Should the described magnetic torque tend to wane unduly when approaching either extreme travel position of the pin 47, the piston return spring 70 acts to compensate for any such torque deficiency; by thrusting downwardly upon the roller 72, said spring serves to supplement the waning armature impulse and thus assures that the desired oscillatory movement shall be wholly completed even should the actuator pin or the compressor piston encounter any augmented external resistance of the like interference in the path of movement. My switch devices are therefore made to function under all conditions of service and intended to obviate a possible stalling or non-starting on part of the armature in case the line current should fail or the supply be inadvertently switched off which might otherwise leave the armature standing in a dead position with both fingers 56 and 58 held out of contact relative to the control segment 51.

Figure 5:
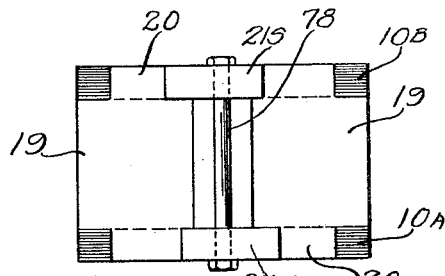
Fig. 5 is a horizontal section taken through the line 5—5 of Fig. 1, assuming the armature parts to have been withdrawn from the duplex field bore.
Figure 4:
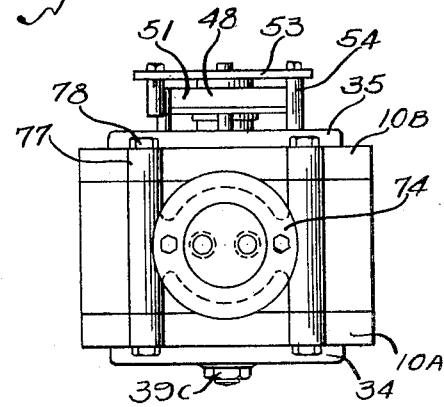
Fig. 4 shows a top view of Fig. 1
Figure 1:
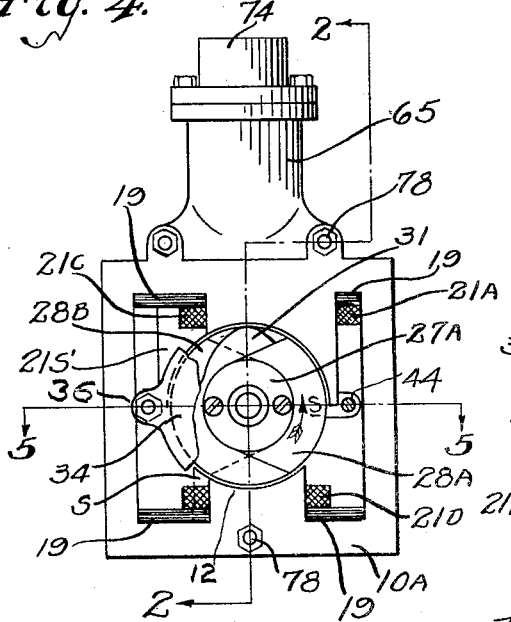
Fig. 1 is an elevational front end view of my unitary device showing a motor frame having a compressor cylinder and piston operatively mounted thereon, the front armature bracket being broken away to better illustrate interior details.
Figure 3:
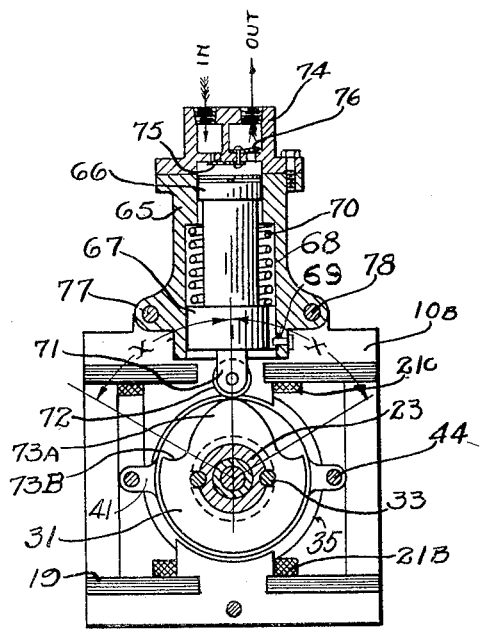
Fig. 3 is a similar view taken at right angles thereto along line 3—3 of Fig. 2.

From the showing in Fig. 3, it will be apparent that the piston 66 is preferably raised into its topmost or head-end position whenever the center-line of the cam throw 73A aligns with the cylinder axis. Should the cam be rocked to either side of said aligned position, the piston is caused to descend on its suction stroke under the influence of the spring 70 which admits a charge of working fluid into the cylinder through the suction valve 75. The follower 72 will in the meantime travel toward one of the cam depressions such as 73B and because of the lateral thrust that is exerted against the relative steep cam side faces, the spring-pressed roller imparts an effective torque movement tending to urge the armature fully onward into one of its extreme oscillatory positions so as to more positively actuate the switch mechanism and serve as a torque compensating device.

The accompanying reversal of armature movement will return the cam throw 73A toward its mid position and thereby compress the cylinder charge and ultimately expel the same through the discharge valve 76. The piston is purposely made to complete a suction stroke and also a discharge stroke during each and every one-way swing or beat of the oscillatory armature. It is further emphasized that the disposition of my drive mechanism is such as to cause the cited revitalized armature pull to come into action at the very time that the piston approaches its head-end dead-center, that is to say when it might be expected to be working against maximum load. The armature is purposely made to operate with a relative high initial torque at the beginning of the piston discharge stroke and is thereby enabled to store energy in the compression spring in addition to overcoming the external piston load; such energy is subsequently restored and serves as a supplemental impelling force to more positively drive the armature in one or the other of its extreme oscillatory positions, as explained. Since my armature is intended to oscillate at comparatively slow rate without the assistance of any substantial flywheel effect, it become desirable to provide for a well sustained driving torque throughout the armature swing range; in this regard both the spring 70 and said supplementary revitalized armature pull, contribute to bring about an equalized torque that is kept sufficiently even to regularly carry the driven piston 66 through its load cycle.

The present invention not only contemplates driving a compressor of the kind that has been specifically described, but is intended to include any style of power absorber capable of being reciprocatively actuated from an intermedially disposed drive linkage including the armature element 31 or the equivalent thereof, which is operatively connected through the field interspacing 10C and requires no bearing other than that used in common for the armature.

As a further refinement, the pair of spaced clamping screws 33 that embrace the sectional armature core are so located that while forming a closed loop-like circuit around said core, its effect is minimized because these screws are placed in a plane falling into the respective center-lines of the oppositely disposed pole shoes 28A and 28B.

In the present disclosure it is not essential that the armature shoes be of the electromagnetized type, since by keeping the shoe polarities in fixed relation, permanent magnets might in certain cases be substituted without producing a functional change.

To recapitulate, it will be seen that I have devised an extremely simple and relatively powerful oscillatory motor in which the armature is mounted in self-centered relation to the field bore and which motor requires no movable coils whatsoever. The armature is arranged to eliminate the separate externally disposed crank mechanism over that conventionally required to drive a reciprocative piston or the like from the end of the armature shaft. In addition, the pairs of my field coils are connected in such fashion that they may be alternately short circuited to bring about reversal of the armature movement rather than require the current flow to be abruptly broken at the termination of such reversal. Both the leading and trailing tips of the armature pole shoe faces are subjected to simultaneous magnetic influence in order that the maximum of a well sustained torque effect may be obtained. Because of the resulting relatively wide-range angular swing that is imparted to my armature, I am enabled to proportionally reduce the size of the motor parts for any given power output.

While an illustrative embodiment of my invention has been set forth in detail, it is to be understood that its more outstanding features are subject to a rather wide latitude in practical application; the respective field pole face profiles need not in all cases be made of uneven length; also the resulting magnetic torque effects may be utilized in an inverse manner, namely by holding the armature stationary and allowing the field piece to bodily oscillate relative thereto; and that various other changes in the details of my motor structure or armature reversal controls may be resorted to, all without departing from the spirit and scope of my invention, heretofore described and more particularly pointed out in the appended claims.

What I claim as my invention is:

1. In a unitary motive device, the combination of electromagnetized bored field-pieces that are axially spaced apart, an axle extending through said bores, brackets respectively upholding the axle ends and which brackets are centered within opposite bore ends, an armature provided with a pair of pole-shoe faces respectively positioned in cooperative relation to a different field-piece bore and arranged to impart an oscillatory movement to the armature, and a stationary excitation coil disposed to excite both pole-shoe faces of the armature.

2. In a unitary motive device, the combination of duplex bored field-pieces that are axially spaced apart, a rotatable armature mounted through said bores, said armature comprising a pair of oppositely disposed pole shoe-faces which are offset lengthwise of the armature axis and respectively positioned within a different field-piece bore in cooperative relation arranged to impart an oscillatory movement to the armature, a cam-like drive element for the armature, said cam being provided with depressions at each profile end thereof and being interposed between said offset shoes with its throw set in a radially medial relationship to said oppositely disposed shoes and a follower member resiliently pressed into operative engagement with said drive element and which member urges the armature toward an extreme oscillatory travel position when said follower approaches registry with one of said profile depressions.

3. In a motive device, the combination of an electromagnetic field piece, an armature, a guided reciprocative follower, a transmission gear for said armature serving to positively drive said follower in one direction of its reciprocative travel, a return spring acting upon the follower and supplementing the armature torque during the reverse direction of follower travel, and switch means actuated by said armature in unison with the return movement of said follower.

4. In a unitary motive device, the combination of a stationary and a movable member, a pair of electromagnetized pole-face means for one such member, a pair of unlike pole-shoe face means for the other member that are cooperatively disposed with respect to the first named face means and adapted to impart a magnetically impelled back and forth movement between such said members, a reciprocative follower, and a drive gear means operatively connecting the movable member with the follower, said gear imparting both an inbound and outbound stroke to the follower during a single oscillatory beat on part of said movable member.

5. A motive device comprising two members mounted for relative movement, of which one such member is provided with duplex bored field-pieces placed in spaced axial alignment, each such piece having a pair of electromagnetized pole-faces that are respectively parted by interpolar gaps to constitute a relatively short pole face-profile and a relatively long pole face-profile, and the other of said members being provided with a pair of circumferentially disposed magnetic electromagnetic pole shoe-faces that are respectively offset axially and positioned within a different field piece bore in a magnetically impelled cooperative relation to the respective pole face profiles thereof, and switch means controlling current flow to the windings of one such member and serving to reverse the aforesaid impulse.

6. An electric motor comprising two members mounted for relative oscillatory movement, of which one such member is provided with oppositely disposed bored field-pieces that are spread apart to provide for an interspace therebetween, each such piece having a pair of electromagnetized pole-faces whose profiles are of unequal length and respectively parted by unequal interpolar gaps, and the other of such members providing for a pair of pole shoe faces that are axially offset and each having a circumferential span length greater than the smaller of said interpolar gaps and which shoe faces are respectively positioned within an oppositely disposed field-piece bore in a magnetically impelled cooperative relation to their respective field pole-faces and arranged in one position of oscillatory travel to simultaneously bridge their respective smaller interpolar gaps, and switch means controlling the energizing current to the windings of the first named member.

7. A unitary field piece for an electromotor or the like, comprising similar multipolar side-pieces of the duplex type, said side-pieces each being built-up from laminated stampings having a bore forming aperture and complementary slots therethrough, and a plurality of magnetic bridge-blocks each of whose respective end regions terminate in a tenon and which tenons are oppositely entered into certain of said slots to maintain the side-pieces in spaced relationship.

8. In an electric motor comprising a field member and a cooperating armature member mounted for relative oscillatory movement, the combination of complementary pairs of field-pole faces, each such pair of pole-faces being provided with series connected excitation coils and which coil pairs are in turn spliced in series to provide complementary end connections, an armature excitation coil connected to one of said free field-coil ends, current supply terminals of which one such is connected to the opposite end of the armature coil while the other of said terminals is connected to the other free end of said field-coils, and three-point switch means of which one point is carried to the spliced connection between the aforesaid pairs of field coils while the remaining two switch points are respectively spliced to the complementary end connections of the field coils.

9. An electric motor comprising a field member and a cooperating electromagnetized armature member, complementary pairs of electromagnetized field-pole faces whose windings are connected in series with each other and also with the armature windings, current supply means, and switch means controlling the windings of one pair of field-pole faces and serving to short circuit the windings of the field-pole faces complementary thereto while maintaining an uninterrupted current flow through the armature windings.

10. In an electric motor comprising a field member and a cooperating armature member mounted for relative oscillatory movement, the combination of complementary pairs of electromagnetized field-pole faces, current supply means, actuated switch control means adapted to excite the windings of one pair of field-pole faces while simultaneously short circuiting the windings of the pair of field-pole faces complementary thereto, and means for actuating said switch in unison with the aforesaid relative movement and thereby shift the current flow so as to excite the windings that were previously short circuited and to short circuit the windings that were previously excited.

11. In an electric motor or the like comprising a field piece and a cooperating armature, the combination of armature sleeve sections disposed in separable end-to-end relation, a pole-shoe carried adjacent to the end region of each such section, a cam-like drive element mounted between the adjoining ends of said sections, and clamping means extending lengthwise of said sleeve and serving to interlock the aforesaid elements into a unitary armature structure.

12. In a bored field piece and an armature cooperating therewith, the combination of an armature hub having a fan-tail pole shoe mounted adjacent to each hub end region and which shoes are oppositely disposed relative to the hub axis, a cam element interposed between said shoes and carried by the hub, an actuating pin overhanging one end of the armature and mounted in a radially offset relation to said axis, and means rotatably mounting said hub within the field bore.

13. An electric motor comprising a bored field-piece, an armature disposed within said field-piece bore and which armature is provided with an internally disposed bearing, a dead-axle entered through said bearing and serving to rotatably mount said armature, a separate bracket for each of the respective field bore ends and which brackets are each provided with shaft receiving holes adapted to fixedly mount the axle therebetween.

14. An electric motor comprising a bored electromagnetized field-piece of the stationary type, an armature rotatably mounted within said bore in a cooperative relation to the field-piece adapted to bring about a magnetically impelled oscillatory movement therebetween, an actuating pin overhanging one end of the oscillatory armature and disposed in a radially offset relation to the armature axis, and a separate bracket for each of the respective field bore ends and of which one such bracket is provided with an aperture arranged to freely receive said oscillating pin therethrough, and switch means actuated by said pin and serving to control current flow to the field windings in unison with the armature movements.

15. An electric motor comprising a laminated field-piece having spaced outermost lamination end-faces and a substantially uniform bore extending therebetween, an armature disposed wholly within said bore, the axial length of said armature being shorter than the bore length and which armature is provided with a pole face, a shaft rotatably mounting the armature pole face in close proximity to said bore and which shaft projects axially beyond each end of said armature, a separate bracket secured to each of the respective field end-faces, each such bracket being provided with a shaft receiving hole and pilot rings concentric thereto and which complementary rings are respectively fitted into opposite ends of the field bore for armature centering purposes.

16. A motive device comprising two members mounted for relative movement, of which one such member is provided with a plurality of bored electromagnetized pole-faces whose profiles are demountedly held in assembled relation, and the other of said members is provided with a pair of pole shoe faces adapted to magnetically cooperate with the aforesaid face profiles and bring about an impelled oscillatory movement therebetween, coil windings disposed within the bore of said one member for withdrawal therethrough and serving to oppositely magnetize the respective pole-shoe faces thereof, a bracket bridging a bore end of said one member, coil sustaining means associated with said bracket, said means allowing the coil to be freely withdrawn through said bore without dismantling the aforesaid other member, and switch means also carried by the bracket and serving to control the energizing current to one such member.

17. In an electric motor device, a field member comprising a pair of bored bipolar side-pieces placed in axial alignment and having their respective innermost bore-end faces spaced apart, an armature provided with a sectional hub and a pole shoe mounted adjacent to each hub end, said shoes being respectively positioned within one of said side-pieces in a cooperative relation to the poles thereof, a flanged spool having excitation windings thereon and which spool is adapted to freely slip over the sectional hub in an interposed relation to said shoes, a retaining lip carried by each of the respective spool flanges and which lips are adapted to engage in breachwise fashion behind the respective innermost bore-end faces of said side-pieces, and means for sustaining said spool.

18. In an electric motor, a bored field member provided with opposite end-faces, a rotatable armature mounted in said bore and comprising a sectional hub having a pole shoe mounted adjacent to each hub end, complementary excitation spools adapted to freely telescope over the hub between said shoes and certain flanges of which spools are equipt with oppositely disposed yoke means, a drive element carried by said hub in an interposed relation to said spools, a pair of rods respectively sustaining said oppositely disposed yokes, and an apertured bracket means adjoined to each of said opposite field end-faces, the ends of said rods being entered through the respective bracket apertures and fixedly supported therebetween.

19. In an electric motor device comprising two relatively movable members, a pair of unlike electromagnetized pole-face means for one such member, which faces are respectively parted by interpolar gaps to constitute a relatively long and a relatively short pole face profile, a pair of unlike electromagnetized pole shoe faces for the other member which are cooperatively disposed with respect to the first named face means and adapted to impart an impelled oscillatory movement therebetween, switch means controlling the excitation current to the coils of one such member, said switch being actuated when an extreme position of oscillatory movement is closely approached, and supplementary impelling means including a resilient pressure applying part arranged to bolster the aforesaid magnetic impulsive effort and urge said members onward into extreme oscillatory position against switch actuating resistance.

20. An electric motor comprising two members mounted for relative movement, of which one such member is provided with a plurality of electromagnetized pole faces having profiles that are respectively parted by interpolar gaps, and the other member provided with a pair of electromagnetized shoe-faces adapted to cooperate with said profiles and bring about an oscillatory movement between said members, switch means controlling the energizing current to the windings of one such member, said switch being provided with complementary contact fingers and a cooperating segment means whose opposite ends are adapted to be alternately shifted into and out of contact with the respective fingers, means for shifting said segment in unison with the movable member, and a floating actuator for said switch adapted to respectively raise a finger out of the path of its approaching leading segment end and to allow said raised finger to drop thereon after said segment end has come into contact range therewith.

21. An electric motor comprising two members mounted for relative movement, of which one such member is provided with a plurality of electromagnetized pole faces having profiles that are respectively parted by interpolar gaps, and the other member is provided with a pair of electromagnetized shoe faces adapted to cooperate with said profiles and bring about an oscillatory movement betwen said members, a pin carried by the movable member, switch means controlling the energizing current to the windings of one such member, said switch including complementary contact fingers and a cooperating drum-like segment means whose opposite ends are adapted to be alternately shifted into and out of contact with the respective fingers by said pin, and a floating finger actuator for said switch having oppositely disposed jaws respectively adapted to be reversely struck in the path of said pin.

22. An electric motor comprising two members mounted for relative movement, of which one such member is provided with a plurality of electromagentized polefaces having profiles that are respectively parted by interpolar gaps, and the other member is provided with a pair of electromagnetized shoe faces adapted to cooperate with said profiles to bring about an oscillatory movement between said members, a pin carried by the movable member, and switch means controlling the energizing current to the windings of one such member and which switch comprises a rotatably mounted disc that is slotted and adapted to receive the pin therethrough and which slot is shorter than the oscillatory travel given to said pin, said switch further comprising a drum-like segment means carried by the disc and arranged to alternately cooperate with complementary contact finger means that are circumferentially spaced apart about said segment such that when the pin approaches an extreme position of its oscillatory travel, the segment will break contact with one of said fingers and make contact with the other of said fingers.

23. An electric motor comprising two members mounted for relative movement, of which one such member is provided with a stationary electromagnetized pole face, and the other is provided with electromagnetized pole faces adapted to cooperate with the first named pole faces to bring about an oscillatory movement therebetween, and switch means equipt with a pair of spaced anti-chattering finger means controlling the energizing current to the windings of one such member and which switch further comprises intermediary means adapted to be shifted in unison with the movable member to break contact with one of said fingers and to make contact with the other finger without wavering on part of the movable member.

24. In an electric motor comprising two relatively movable members, a pair of unlike electromagnetized pole-face means for one such member, a pair of unlike electromagnetized pole-shoe faces for the other member that are cooperatively disposed with respect to the first named faces and adapted to initiate a magnetically impelled movement therebetween, switch means controlling the excitation current to the coils of one such member, a reciprocative torque compensating device arranged in one stroke direction to take up mechanical energy from one such impelled member and to restore energy thereto during the return stroke of said device, and drive means for actuating said switch from said one member in synchronism with the return stroke movement of said device.

25. In an electric motor, a member comprising a pair of bored field pole faces that are parted by interpolar gaps, a pivotally mounted armature provided with a pole shoe face having a magnetization coil associated therewith, said shoe face being alternately impelled in and out of overlapping proximity with the respective bored pole faces, a primary source of alternating current, a separate winding for each of said bored poles, the respective windings being so disposed that one such alone will be brought into intimate inductive relation with said coil when the armature approaches an extreme oscillatory travel position, and switch means serving to short-circuit said one winding and which coil thereupon induces a current flow in said winding tending to impell the armature out of the aforesaid intimate inductive relationship.

26. In an electric motor comprising two cooperating members mounted for relative movement, of which one such is provided with a field pole face and the other member comprises a pivotally mounted electromagnetized armature having a single shoe face of finite length disposed about the pivot axis, means for impelling said shoe face into and out of overlapping proximity with said field pole face, a primary source of alternating current, a primary winding for said field pole, said shoe face being disposed to assume intimate inductive relation with said winding when brought into the aforesaid overlapping proximity, and switch means serving to short-circuit said winding while said intimate inductive relation prevails and to open said short-circuit after said shoe face has magnetically repelled itself out of intimate inductive relation with said winding by superimposing an additive torque effect upon the aforesaid impelling means.

27. In an electric motor comprising a field member and a cooperating armature member mounted for relative oscillatory movement, the combination of complementary pairs of field-pole faces, each such pair of pole-faces being provided with series connected excitation coils and which coil pairs are in turn spliced in series to provide complementary end connections, an armature excitation coil, current supply terminals of which one such is carried to the spliced connections between the aforesaid pairs of field coils and the other of which terminals is connected to one of the armature coil ends, and a three-point switch of which one point is carried to the other armature coil end while the remaining two switch points are respectively spliced to said complementary end connections of the field coils.

28. An electric motor comprising a pair of members mounted for relative oscillatory movement, each such member being provided with a pole face cooperatively disposed and adapted to initiate a magnetically impelled movement therebetween, actuator means of the floating shiftable type provided with a pair of spaced abutments and which actuator is yieldably retained in a certain original position, striker means carried by one of the members and adapted to freely move within the confines of the abutment spacing except when the aforesaid one member approaches extreme oscillatory travel, whereupon said striker engages an abutment and shifts the actuator out of its original position, cam means operatively connected to shift in unison with the actuating means, and means returning the actuator to its original position.

29. An electric motor comprising a pair of members mounted for relative oscillatory movement, each such member having a pole face and which faces are cooperatively disposed to initiate a magnetically impelled movement therebetween, actuator means of the floating shiftable type equipt with a pair of spaced abutments, striker means carried by one of the impelled members and arranged to move with a limited degree of freedom between said abutments until said one impelled member approaches an extreme travel position, whereupon said striker engages one of the abutments and shifts the actuator along therewith, and follower means serving to store mechanical energy therein, said follower being operatively connected to function in unison with the aforesaid one impelled member while the striker moves freely toward said one abutment.

In testimony whereof, I have herewith set my hand this 14th day of July, 1930.

HARVE R. STUART.